July 5, 1960

J. W. BAXTER 2,943,444

COMBINATION THRUST AUGMENTER, SOUND SUPPRESSOR
AND THRUST REVERSER FOR JET ENGINES

Filed April 28, 1958

*INVENTOR.*
JOHN W. BAXTER
BY
*Knox & Knox*

United States Patent Office 2,943,444
Patented July 5, 1960

2,943,444

COMBINATION THRUST AUGMENTER, SOUND SUPPRESSOR AND THRUST REVERSER FOR JET ENGINES

John W. Baxter, San Diego, Calif., assignor to Ryan Aeronautical Co., San Diego, Calif.

Filed Apr. 28, 1958, Ser. No. 731,160

1 Claim. (Cl. 60—35.54)

The present invention relates generally to aircraft jet engines and more particularly to a combination thrust augmenter, sound suppressor and thrust reverser for jet engines.

The primary object of this invention is to provide a jet engine thrust control means which will admit a controlled flow of secondary air to the exhaust gas stream to augment the thrust of the engine and, by the mixing of the hot exhaust gases and secondary air, suppress the noise of the exhaust.

Another object of this invention is to provide a jet engine thrust control means in which movable baffles are installed within the thrust augmenter opening and which, combined with a spheroidal mouth portion, constitute an efficient, holllow hemispherical baffle to block to the exhaust outlet and substantially reverse the flow of gases back through the augmenter intake opening.

A further object of this invention is to provide a jet engine thrust control means in which the thrust reverser is self neutralizing in the event of actuator failure, so that full normal thrust is available in an emergency.

Still another object of this invention is to provide a thrust control means which, when not in use, is fully retracted and does not interfere with normal operation of the engine, the structure comprising a simple integral assembly, movable and operable as a unit.

Finally, it is an object to provide a jet engine control means of the aforementioned character which is simple and convenient to install and operate and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure, and in which:

Similar characters of reference indicate similar or identical elements and portions throughout the specification and throughout the views of the drawing.

Figure 1:
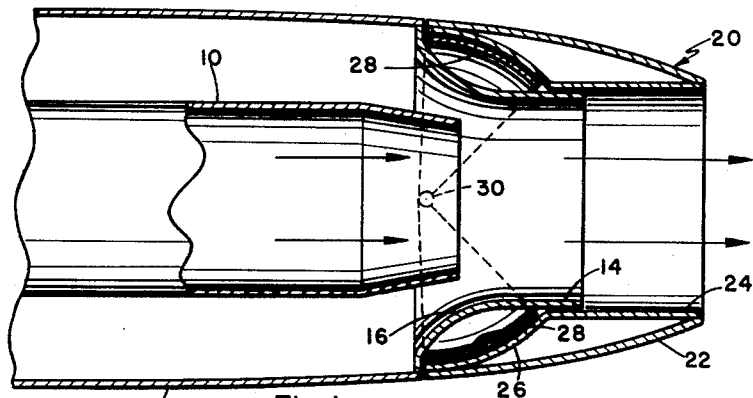
Figure 1 is a longitudinal sectional view of the rear portion of a jet engine tailpipe with the thrust control mechanism attached and in closed position.

Referring now to the drawing in detail, the installation includes a jet engine, not shown, having a tailpipe 10 which is enclosed in a structural cowling 12 such as the fuselage or engine nacelle of an aircraft. The rear portion of the cowling 12 has a reduced diameter stub outlet 14 having a flared bell portion 16 at its junction with the cowling. Mounted behind the cowling 12 and concentric with the tailpipe 10 is a thrust control assembly 20 comprising an outer cowling extension 22 and an inner cylindrical nozzle 24, the forward end of said nozzle having a generally spheroidal mouth portion 26. The nozzle 24 fits over the end of the stub outlet 14 and, in the closed or inoperative position, merely forms an extension of said outlet, as in Figure 1. The assembly 20 must be mounted for axial adjustment but the specific mounting means, of track or analogous character, is not particularly critical and is deleted from this showing in the interest of simplicity.

Figure 2:
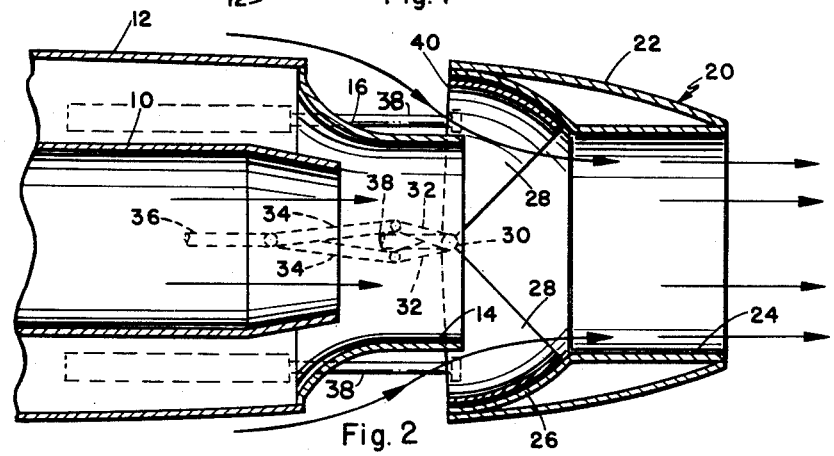
Figure 2 is a sectional view similar to Figure 1, but with the mechanism partially open in the augmenting and sound suppression position.

Mounted in the mouth portion is the thrust reverser mechanism comprising a pair of generally spheroidal shell segments 28 pivotally connected at their apices by diametrically opposed hinges 30 at the forward edge of said mouth portion. The mouth portion 26 and the shell segments are substantially concentric and allowance is made for the necessary operating clearances. In inoperative position, as indicated in Figures 1 and 2, the shell segments extend over a major portion of the area of the mouth portion 26. Fixed to the shell segments 28, adjacent the hinges 30, are actuating arms 32, the ends of which are pivotally connected to a pair of links 34 extending from an actuating rod 36, said actuating rod being longitudinally movable by means of a suitable jack or similar mechanism.

As illustrated, the entire thrust control assembly 20 is movable axially by means of extension rods 38 operated by jacks or the like, the mechanisms and controls involved being well known in the art. It should be understood that other actuating means for the assembly 20 and the shell segments 28 may be used according to the particular requirements of the installation. Since the mouth portion 26 and the shell segments are substantially concentric, the shell segments, in the operative positions thereof constitute a continuation and complement of the mouth portion and with the mouth portion define a hollow hemispherical thrust reversing baffle which is efficient in action.

In the inoperative position, the thrust control assembly 20 is retracted and forms the rear portion of the cowling 12, there being no interference with the normal operation of the engine. For take-off of the aircraft, the thrust control assembly 20 is partially extended, as shown in Figure 2, so that an annular inlet 40 is defined between the mouth portion 26 and the stub outlet 14. With the jet engine in operation, the flow of exhaust gases from the tailpipe 10, out through the nozzle 24, induces a secondary flow of surrounding air inwardly through the inlet 40, as indicated by the directional arrows. This cold secondary air mixes with the hot exhaust gases and augments the thrust by adding to the mass flow, the use and function of such augmenters being well known. In addition, the mixing of the exhaust gases and the secondary air results in a lower overall temperature and a reduced velocity in the combined gas flow, so reducing the noise level of the exhaust. It has been found that the intense noise caused by a jet engine exhaust is primarily due to the high velocity, concentrated stream of hot gases shearing through the relatively still, cold air downstream of the nozzle. The mixing of the secondary air causes a certain amount of turbulence in the exhaust stream and facilitates the mixing of the gases with the downstream surrounding air, also breaking up or dampening the high intensity pressure waves which cause the objectionable noise normally audible for a considerable distance, with the net result that the exhaust noise is materially attenuated.

Figure 3:
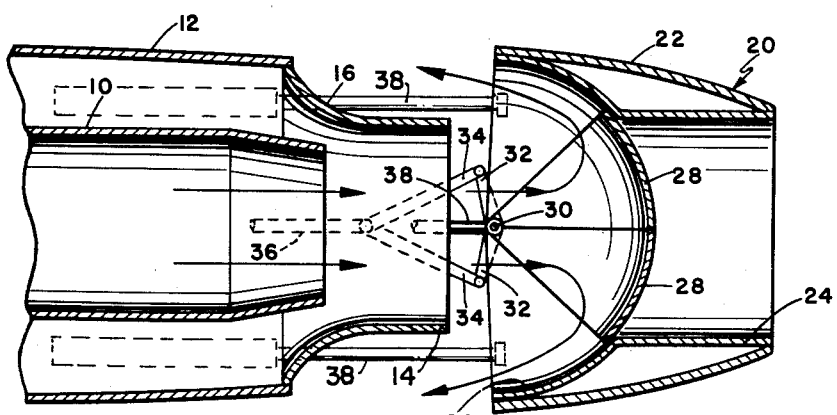
Figure 3 is a sectional view similar to Figure 2, but with the thrust reverser in operation.

In flight, the thrust control assembly 20 may be fully retracted or can be left partially open for thrust augmentation. For landing the aircraft, the thrust control assembly 20 is fully extended, as in Figure 3, and the shell segments 28 are closed by operating the actuating rod 36 to pivot the arms 32. The shell segments 28 swing inwardly from the mouth portion 26 and come together to block the nozzle 24, so that the exhaust gases are deflected outwardly and reversed in direction for final ejection in the general direction of flight. The resultant braking action greatly reduces the landing run of the aircraft. Various degrees of closure of the shell segments 28 may be used to achieve partial thrust reversal or spoilage. Since the shell segments 28 are separated diametrically of the axis of the assembly, and each shell segment is disposed asymmetrically with respect to said axis of the assembly, the center of area of each segment is spaced considerably from the axis of the nozzle.

In addition, the outer portions of the shell segments 28 are curved toward the source of gas flow, thus the resultant of the static pressure forces acting on each shell does not intersect the hinge 30, but is offset to the side in such a manner that the shells always tend to swing outwardly to their fully separated position. This self neutralizing is a useful function since, in the event of failure of the thrust reverser actuator system, the gas pressure tends to open the shell segments 28, making full normal thrust available in an emergency.

The assembly shown performs the three functions of thrust augmentation, noise suppression and thrust reversal, yet the entire structure is contained in a single compact assembly which can be built within the existing contour limits of airframe structure of many types of aircraft. The assembly is light in weight, rigid and contains a minimum of moving parts, and is operable to provide a wide range of thrust control.

The operation of this invention will be clearly comprehended from a consideration of the foregoing description of the mechanical details thereof, taken in connection with the drawing and the above recited objects. It will be obvious that all said objects are amply achieved by this invention.

It is understood that minor variation from the form of the invention disclosed herein may be made without departure from the spirit and scope of the invention, and that the specification and drawing are to be considered as merely illustrative rather than limiting.

I claim:

In a jet engine installation: a jet engine and an enclosing structure surrounding said engine; a thrust control assembly mounted rearwardly of said jet engine and substantially coextensive with said enclosing structure, said assembly including a nozzle coaxial with said jet engine; said nozzle having a generally spheroidal, forwardly concave mouth portion; means for moving said assembly axially rearwardly to define an opening between said enclosing structure and said mouth portion to admit air to said nozzle for mixture with an augmentation of the jet engine exhaust; a pair of generally spheroidal shell segments mounted in said mouth portion in overlapping concentric relation therewith and pivotally connected at their apices on an axis substantially diametrical to said assembly; said shell segments, when swung inwardly together, constituting a continuation and central complement of said mouth portion in defining a composite, concave thrust reversing baffle having the general form of a hollow hemisphere; means for swinging said shell segments to block said nozzle, whereby the exhaust is deflected forwardly through said mouth portion; said shell segments being each asymmetric with respect to said axis so that the exhaust gas stream tends to separate the segments and clear the nozzle for normal thrust.

References Cited in the file of this patent

UNITED STATES PATENTS

| 2,648,192 | Lee | Aug. 11, 1953 |
| 2,735,264 | Jewett | Feb. 21, 1956 |
| 2,886,946 | Parker | May 19, 1959 |

FOREIGN PATENTS

| 778,008 | Great Britain | July 3, 1957 |